United States Patent
Meyer et al.

(10) Patent No.: US 9,824,094 B1
(45) Date of Patent: *Nov. 21, 2017

(54) SYSTEMS AND METHODS FOR PRIORITIZING FILE DOWNLOADS

(71) Applicant: Google Inc., Mountain View, CA (US)

(72) Inventors: Cayden Meyer, Pyrmont (AU); Ian Kilpatrick, Forest Lodge (AU)

(73) Assignee: GOOGLE INC., Mountain View, CA (US)

(*) Notice: Subject to any disclaimer, the term of this patent is extended or adjusted under 35 U.S.C. 154(b) by 300 days.

This patent is subject to a terminal disclaimer.

(21) Appl. No.: 14/260,519

(22) Filed: Apr. 24, 2014

(51) Int. Cl.
*G06F 17/30* (2006.01)

(52) U.S. Cl.
CPC .............. *G06F 17/30194* (2013.01)

(58) Field of Classification Search
None
See application file for complete search history.

(56) References Cited

U.S. PATENT DOCUMENTS

| | | | |
|---|---|---|---|
| 7,529,785 B1 | 5/2009 | Spertus | |
| 8,433,674 B2 | 4/2013 | Takata et al. | |
| 2007/0226213 A1* | 9/2007 | Al-Masri | G06F 17/30613 |
| 2011/0022642 A1 | 1/2011 | deMilo et al. | |
| 2011/0246719 A1* | 10/2011 | Knox | G06F 12/0866 711/118 |
| 2011/0265077 A1 | 10/2011 | Collison et al. | |
| 2011/0276538 A1* | 11/2011 | Knapp | G06F 17/302 707/626 |
| 2011/0276656 A1 | 11/2011 | Knapp et al. | |
| 2013/0191397 A1* | 7/2013 | Avadhanam | G06F 17/3053 707/748 |
| 2014/0108956 A1 | 4/2014 | Varenhorst | |

FOREIGN PATENT DOCUMENTS

WO WO-2014032608 A1 3/2014

OTHER PUBLICATIONS

International Search Report and Written Opinion dated Jul. 2, 2015 for International Application No. PCT/US2015/026540, International Filing Date Apr. 17, 2015.

* cited by examiner

*Primary Examiner* — Amresh Singh
(74) *Attorney, Agent, or Firm* — Lowenstein Sandler LLP

(57) ABSTRACT

Systems and methods are disclosed herein for downloading data from a cloud system. A plurality of files on the cloud system is identified for downloading to a client system, where the plurality of files is associated with metadata. A respective score for each file in the plurality of files is evaluated by applying a ranking scheme to the metadata, where the ranking scheme is based on at least two features of the metadata. A download process is initiated for at least some files in the plurality of files based on each file's respective score.

20 Claims, 8 Drawing Sheets

| FILE ID | SIZE | FILE TYPE | TIME OF CREATION | TIME OF LAST EDIT | FOLDER DEPTH |
|---|---|---|---|---|---|
| 154 | 1.8 MB | TEXT | JAN-21-2014 9:10 AM | JAN-24-2014 1:09 PM | 4 |
| 1857 | 0.6 MB | SPREADSHEET | AUG-08-2010 12:05 PM | JAN-23-2014 11:20 AM | 5 |
| 675 | 4.9 MB | VIDEO | MAR-31-2011 4:23 PM | MAR-31-2011 4:23 PM | 4 |
| 2435 | 0.1 MB | AUDIO | MAR-31-2011 4:40 PM | MAR-31-2011 4:40 PM | 6 |
| 931 | 0.03 MB | TEXT | JUL-09-2013 2:58 PM | JUL-09-2013 2:58 PM | 9 |
| 1526 | 457 MB | VIDEO | SEP-20-2013 1:10 PM | SEP-20-2013 1:10 PM | 5 |

| FILE ID | SIZE TYPE | FILE TYPE | TIME OF CREATION - RECENT? | TIME OF LAST EDIT - RECENT? | FOLDER DEPTH - DEEP? | SCORE |
|---|---|---|---|---|---|---|
| 154 | LARGE | DOCUMENT | YES | YES | NO | 0.9 |
| 1857 | SMALL | DOCUMENT | NO | YES | NO | 0.8 |
| 675 | LARGE | MEDIA | NO | NO | NO | 0.1 |
| 2435 | SMALL | MEDIA | NO | NO | YES | 0.2 |
| 931 | SMALL | DOCUMENT | YES | YES | YES | 0.6 |
| 1526 | LARGE | MEDIA | YES | YES | NO | 0.2 |

FIG. 3

SYSTEMS AND METHODS FOR PRIORITIZING FILE DOWNLOADS

FIELD OF THE INVENTION

In general, this disclosure relates to data storage, in particular, to systems and methods for downloading files from cloud storage.

BACKGROUND

Web-based storage systems are file hosting systems that allow users to store and retrieve data accessible from one or more user devices. These storage systems may use cloud storage to store user data. Known methods for downloading user data from cloud storage may be only based on an alphabetical order of the files, or based on an order in which the files appear in a folder. However, in regions where bandwidth is limited, this may cause substantial delays in allowing a user to get local access to a file that is important to the user.

SUMMARY

Systems and methods are disclosed herein for downloading data from a cloud system. A plurality of files on the cloud system is identified for downloading to a client system. The plurality of files is associated with metadata, and a respective score is evaluated for each file in the plurality of files by applying a ranking scheme to the metadata. The ranking scheme is based on at least two features of the metadata. A download process is initiated for at least some files in the plurality of files based on each file's respective score.

Another aspect relates to a system including means for downloading data from a cloud system. The system includes means for identifying a plurality of files on the cloud system for downloading to a client system. The plurality of files is associated with metadata, and the system further includes means for evaluating a respective score for each file in the plurality of files by applying a ranking scheme to the metadata. The ranking scheme is based on at least two features of the metadata. The system further includes means for initiating a download process for at least some files in the plurality of files based on each file's respective score.

In some embodiments, the system further includes means for selecting at least some files in the plurality of files based on each file's respective score and an amount of storage availability on the client system. The system may further include means for downloading the plurality of files to the client system in an order defined by the respective scores. The respective score for each respective file in the plurality of files may be indicative of a likelihood that a user will access the respective file on the client system.

In some embodiments, the ranking scheme is trained using a machine learning technique on existing cloud data in the cloud system. The system may include means for separating the existing cloud data into at least two groups of cloud data, and applying the machine learning technique on the at least two groups of cloud data to train at least two ranking schemes. The metadata may include at least two of: file size, file type, file history, time of last write, time of last access, time of initial creation, folder depth, and user specific data. The metadata may include a set of binary features that describe each file in the plurality of files. In some embodiments, the cloud system includes a processor that applies the ranking scheme to the plurality of files. The cloud system may include a processor that periodically updates the ranking scheme based on updated cloud data.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on a database that includes data related to files that are stored on a web-based storage system, according to an illustrative embodiment.

FIG. 3 is an example data structure stored on a database that includes processed data related to files that are stored on a web-based storage system, according to an illustrative embodiment.

DETAILED DESCRIPTION

To provide an overall understanding of the disclosure, certain illustrative embodiments will now be described, including a system for downloading files from a cloud storage system. In particular, a device is described that allows for prioritized downloading of files from cloud storage to a local system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing prioritized downloading of data that is stored on a cloud system such as a web-based storage system to a client system such as a local storage device. The systems and methods described herein allow for a set of user files on a web-based storage system to be prioritized according to a ranking score that is indicative of a predicted likelihood that the user files will be accessed soon after being downloaded to the client system. By prioritizing the user files according to this predicted likelihood, the user has earlier local access to files that are more important than other files. The systems and methods of the present disclosure are described herein in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
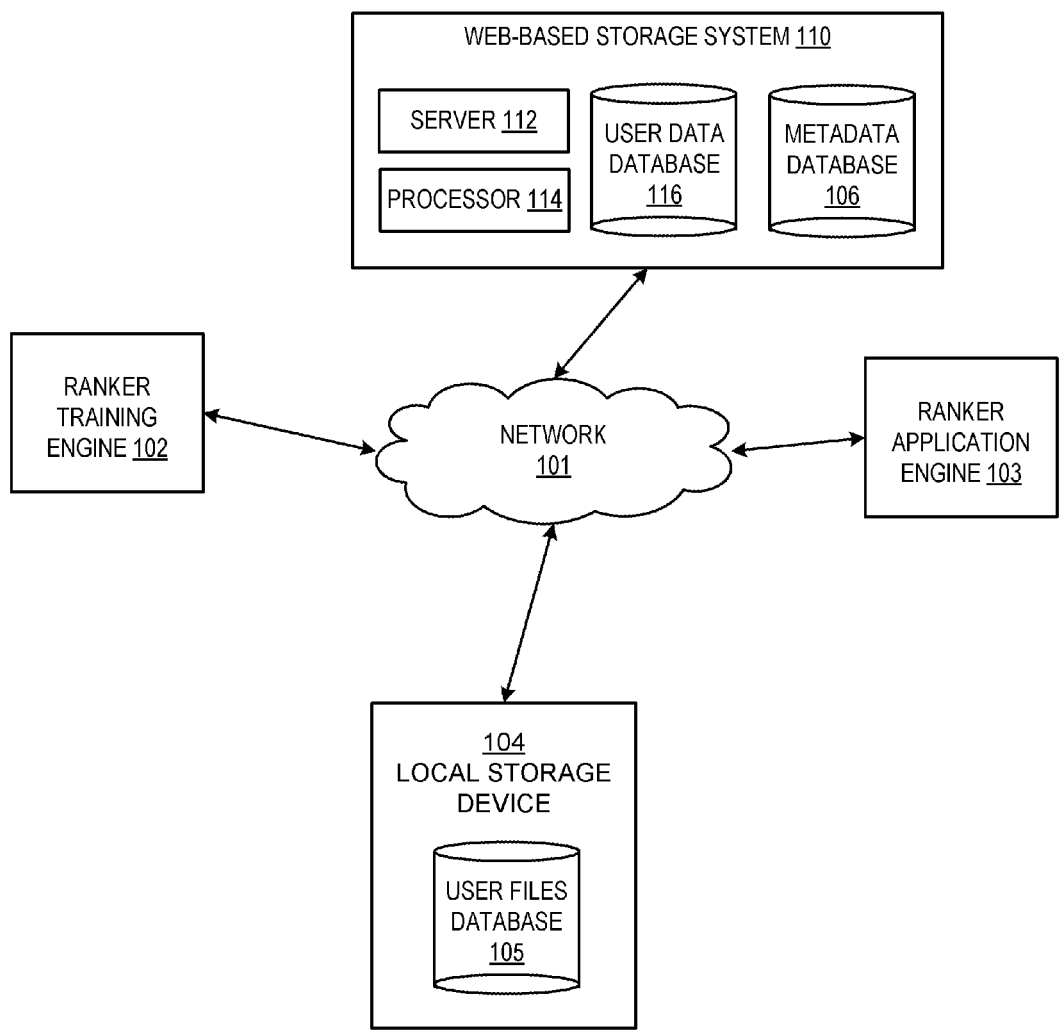
FIG. 1 is a block diagram of a computerized system for allowing data stored on a web-based storage system to be downloaded to a local storage device, according to an illustrative embodiment.

FIG. 1 depicts an example of a network and database structure that may be used to implement the systems and methods herein. FIG. 1 is a block diagram of a computerized system 100 for allowing data stored on a web-based storage system for downloading to a local storage device. The system 100 includes a web-based storage system 110, a local storage device 104, a ranker training engine 102, and a ranker application engine 103, all configured to communicate over a network 101. The local storage device 104 includes a user files database 105 that stores files. The web-based storage system 110 includes a server 112, a processor 114, a user data database 116, and a metadata database 106 that stores metadata related to the files in the user data database 116. The ranker training engine 102 is configured to communicate with the web-based storage system 110 to allow the ranker training engine 102 to have access to user data that is stored on the web-based storage system 110, such as in a user data database 116. The ranker training engine 102 processes the user data on the web-based storage system 110 to obtain a ranker, which may be a set of rules that define a ranking order of a set of files based on the characteristics of those files. The ranker may have the form of a machine learning ranking system, a machine learning classifier, or any other suitable system for ranking a set of files. The machine learning system may involve Bayesian statistics, neural networks, support vector machine models, or any other suitable type of machine learning technique. The set of rules defined by the ranker is then applied by the ranker application engine 103 to user data that is stored on the user data database 116 to determine an appropriate ordering of the files stored on the user data database 116 for downloading to the local storage device 104. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 110, one local storage device 104, one ranker training engine 102, and one ranker application engine 103 are shown in FIG. 1 to avoid complicating the drawing. In general, the system 100 can support multiple web-based storage systems, local storage devices, ranker training engines, and ranker application engines.

The web-based storage system 110 is a file hosting system that allows users to store, retrieve, and modify data. This data may be referred to as a user's web data, which is stored in the user data database 116. The server 112, the processor 114, or both may perform functions related to maintaining the user data database 116, such as allocating memory for the data, receiving new data to be stored in the database, deleting data in the database, providing indications of how much storage space is available in the database, or any other suitable function related to database maintenance. The web-based storage system 110 may be stored on a single server system or in a distributed system. In particular, the web-based storage system 110 may use cloud storage to store user data.

It may be desirable to a user of the local storage device 104 to download some or all of the user files stored on the web-based storage system 110 to the local storage device 104. As an example, the local storage device 104 may be a personal computer device, and the user of the local storage device 104 may have access to other personal devices such as other personal computers, laptops, mobile devices, or tablets that are also capable of communicating with the web-based storage system 110 over the network 101. In this case, it may be desirable to allow the user to use multiple devices that have access to the same set of files that are stored on the web-based storage system 110. When a new user device is coupled to the network 101 and the user indicates that the new device should also have access to the set of files stored on the web-based storage system 110, a download process is performed from the web-based storage system 110 to the new user device. In this case, the user may provide an input to the local storage device 104 indicating which user files that are stored in the user data database 116 should be downloaded to the user files database 105 in the local storage device 104. Moreover, the user's input may indicate one or more folders containing user files for downloading to the user files database 105. The local storage device 104 is described in detail in relation to FIG. 4. As shown in FIG. 1, the user data database 115 and the metadata database 106 are shown as separate databases, but in general, data stored on the user data database 115 and the metadata database 106 may be stored on the same database or different databases.

In some embodiments, the systems and methods of the present disclosure are applied to an uploading process that uploads files from the local storage device 104 to the web-based storage system 110. After the appropriate folders or files on the local storage device 104 are selected for uploading to the web-based storage system 110, the files in the selected folders are ranked in accordance with a priority score that is assigned to each file. The priority score for each file is indicative of a predicted likelihood that the user will access the respective file soon after the file is uploaded to the web-based storage system. The files are then uploaded in an order defined by the priority scores. In this manner, the files that are predicted to be most urgently needed by the user to be accessible on the web-based storage system 110 are uploaded before other files that are less urgently needed. Systems and methods for ranking files for uploading to the cloud system are described in detail in relation to Kilpatrick et al., U.S. patent application Ser. No. 14/260,497, filed Apr. 24, 2014, which is hereby incorporated by reference herein in its entirety.

In some embodiments, a set of folders that store user files are automatically selected for uploading to the web-based storage system 110. In this case, the automatic selection may be performed based on characteristics associated with the folders. In particular, some folder characteristics may provide predictive capability with respect to whether a user will require access to certain folders on the web-based storage system 110. The folders in local storage device 104 may be analyzed to assess a predicted likelihood that the user will wish to have access to each folder on the web-based storage system 110. Systems and methods for automatic folder selection are described in detail in relation to Kilpatrick et al., U.S. patent application Ser. No. 14/260,509, filed Apr. 24, 2014, which is hereby incorporated by reference herein in its entirety.

After identifying the set of files for downloading from the web-based storage system 110, the ranker application engine 103 assigns a rank to each file in the set of files by performing a ranking method. The rank that is assigned to each file determines an order in which the specified user files are downloaded from the web-based storage system 110, and is determined based on a predicted likelihood that the user will need to access the specified files. In particular, the user may need access to certain files from the web-based storage system 110 on the local storage device 104 before other files. In this case, prioritizing the files for downloading from the web-based storage system 110 enables the user to have earlier access to higher priority files from the local storage device 104. In particular, the higher priority files correspond to those that are predicted to be more likely to be frequently or earlier accessed by the user from the local storage device 104.

In one example, the web-based storage system stores a document file and a video file in the user data database 115, and both the document file and the video file are designated for downloading from the web-based storage system 110. The user has been working on the document file recently, and has opened and edited the document file frequently over the last several days over the web-based storage system from other user devices. In contrast, the user has only accessed the video file once about one year ago. In this case, the priority of the document file may be higher than the priority of the video file, because it is more likely that the user will wish to access the document file from the local storage device 104 earlier than the video file. The ranker application engine 103 is configured to recognize the difference in priority between the document file and the video file, and should select to prioritize the document file over the video file. The higher priority assigned to the document file causes the document file to be downloaded from the web-based storage system 110 before the video file is downloaded.

The ranking method that is applied by the ranker application engine 103 is determined from a set of rules based on the metadata that is stored in the metadata database 106. In particular, the metadata includes data that characterizes user files stored on the user data database 115. An example data structure that includes some example forms of metadata is shown and described in relation to FIG. 2. In particular, the metadata may include a size of the file, a type of the file, a time of creation of the file, a time of last edit of the file, a time of last access of the file, a folder depth of the file, or any other suitable data that characterizes a file and may serve as a predictor of a likelihood that the user will require access to the file. The metadata is used by the ranker application engine 103 to assign a ranking score to each file designated by the user for downloading from the web-based storage system 110.

The ranker training engine 102 may perform a machine learning technique on a set of user files that are stored on the user data database 116 in the web-based storage system 110. The user data database 116 may include data associated with one user or any number of users of the web-based storage system 110. The machine learning technique results in the set of rules that are used by ranker application engine 103 to assign scores to files that are designated for downloading to the local storage device 104. As used herein, to "train" a data set means to generate a ranking set of rules that may accurately predict a likelihood that a user will wish to access a particular file on the local storage device 104 earlier than other files. The ranker training engine 102 trains the data by receiving two inputs: an input vector and an answer vector. As used herein, the input vector refers to metadata that is associated with the user files that are stored on the user data database 116, and the answer vector refers to a known frequency of access of the files that are stored on the user data database 116 by one or more users.

The ranker training engine 102 applies statistical modeling methods to fit a predictive model that may be used to predict the frequency of access from the metadata. The predictive model includes the set of rules that define how certain features of a file, such as its metadata, are predicted to affect the frequency of access of that file by the user. The predicted frequencies of access of the set of files (as predicted by the predictive model) are compared to the actual frequencies of access of the set of files (i.e., the answer vector). If the predicted frequencies mostly match the actual frequencies, the predictive model has performed well. However, if there are substantial differences between the predicted frequencies and the actual frequencies, one or more parameters of the predictive model may be updated, and the updated predicted frequencies may be compared to the actual frequencies. These steps are repeated until the performance of the predictive model satisfies one or more criteria, such as exceeding a threshold, and the ranker training engine 102 provides the final resulting predictive model to the ranking application engine 103 over the network 101. The ranking application engine 103 then applies the final predictive model to the test data set (i.e., the specified files stored on the web-based storage system for downloading), which may be associated with unknown or uncertain frequencies of user access. In this way, applying the final predictive model to the test data set thus allows for prediction of the likelihood that the user will wish to access the downloaded files from the local storage device 104.

In some embodiments, after the ranker training engine 102 has generated a final resulting predictive model, the ranker training engine 102 periodically updates the predictive model. In particular, the ranker training engine 102 may periodically perform the machine learning training technique on user files in the web-based storage system 110. The update may be performed any time the user files stored on the web-based storage system 110 change, such as any time the files are added, replaced, deleted, modified, or accessed. Alternatively, the update may be performed once in a pre-specified length of time, such as once a day, a week, a month, or any other suitable period of time.

In some embodiments, the ranker training engine 102 is configured to perform the machine learning training technique based on different sets of user files for different users or subsets of users. In general, there may not be enough data on the web-based storage system 110 to train a different predictive model for each user. However, by grouping similar users together, the performance of the predictive models may be improved compared to having a single predictive model for all users of the web-based storage system 110. In this case, the ranker training engine 102 separates the set of user files that are stored on the web-based storage system 110 into subsets of user files. Each subset of user files corresponds to a subset of users associated with the web-based storage system 110. The machine learning training technique is performed separately on each subset of user files, such that multiple predictive models (i.e., one for each subset of user files) are generated. This may be desirable when the different users have different priorities or frequencies of access of their user files. For example, the ranker training engine 102 may recognize that a first subset of users stores many more text files than video files (or accesses text files more frequently than video files) on the web-based storage system 110, and a second subset of users stores many more video files than text files (or accesses video files more frequently than text files). In this case, the ranker training engine 102 may recognize that these different subsets of users have different priorities for their user files, such that the subsets of users should be treated differently in the ranking process.

In some embodiments, a clustering algorithm may be performed on the aggregate set of users to form clusters of subsets of users based on the types of files that the users store and/or frequently access, or any other characteristic associated with the users. In an example, the users may be sorted into different subsets of users based on whether the users are new users of the web-based storage system 110. In particular, new users may have few files to download from the web-based storage system than users who have been using the web-based storage system 110 for a specified period of time. Thus, the new users may be treated differently from the old users. In particular, the web-based storage system 110 contains less information on the new users than on the old users. In this case, it may be desirable to apply different predictive models for the new users compared to the old users. In particular, a default generic predictive model may be initially applied to the new users, until the web-based storage system 110 collects enough information regarding the user to appropriately assign the user to a subset of users.

In general, any number of subsets of users may be separated and have different predictive models applied to their user files. However, one of ordinary skill in the art will recognize that there is a tradeoff between performance of the predictive model and the size of the training data set. In particular, if the users are separated into too many subsets, there may be too little user data available on the web-based storage system 110 to train a predictive model that has the desired accuracy in predictive power. In an extreme example, training may be attempted on the user files on the web-based storage system 110 that are associated with a single user. However, if that user does not access the web-based storage system 110 often and only uses the web-based storage system 110 to back up a small number of his user files, the ranker training engine 102 would not have access to much data regarding the frequency of access of those user files on the web-based storage system 110. In that case, the predictive model generated by the ranker training engine 102 may perform poorly. In contrast, a predictive model may perform well if it was trained on another single user who stores all of his user files on the web-based storage system 110 and frequently accesses and modifies his user files on the web-based storage system 110. Thus, the performance of the predictive model is dependent on the amount of user data available to train the predictive model, and the training data sets may be separated according to users who have different characteristics, such as users who access their user files differently, or users who have different amounts of user data stored on the web-based storage system 110.

As shown in FIG. 1 the ranker training engine 102 and the ranker application engine 103 are separate devices from the web-based storage system 110 and local storage device 104. However, one of ordinary skill in the art will understand that one or both of the ranker training engine 102 and the ranker application engine 103 may be stored on the same device as the web-based storage system 110 or the local storage device 104. In particular, because both the ranker training engine 102 and the ranker application engine 103 access the user data that is stored on the user data database 116, it may be desirable for both the ranker training engine 102 and the ranker application engine 103 to be stored on the same device as the web-based storage system 110. In this case, the ranker training engine 102 and the ranker application engine 103 may access the user data from the user data database 116 without having to communicate through the network 101. In general, the ranker training engine 102 and the ranker application engine 103 are stored on the same device or on different devices, which may be on the same device as the web-based storage system 110, the local storage device 104, or a separate device.

FIG. 2 is an example data structure 200 that is stored on the web-based storage system 110. As an example, data structure 200 is stored on the metadata database 106, which describes features of files that are stored on the user data database 115. The data structure 200 includes a list of six files, each having a file identifier. The file identifier may be a unique string of letters, numbers, or both that are assigned to each file. For each file, the data structure 200 has a field entry for the size of the file, a type of the file, a time of creation of the file, a time of last edit of the file, and a folder depth of the file. The folder depth corresponds to a number of nested folders or subfolders that are associated with a file's location on the web-based storage system 110.

As shown in FIG. 2, file 154 has size 1.8 megabytes, is a text file, was created at 9:10 am on Jan. 21, 2014, was last edited at 1:09 pm on Jan. 24, 2014, and has a folder depth of 4. Moreover, file 1526 has size 457 megabytes, is a video file, was created at 1:10 pm on Sep. 20, 2013, was last edited at the same time it was created, and has a folder depth of 5. The data structure 200 indicates that the user has accessed file 154 much more recently compared to file 1526. Thus, if the predictive model generated by the ranker training engine 102 indicates that time of last edit, file type, or size are important characteristics in predicting the likelihood that the user will need early access to a file on the local storage device 104, then the ranker application engine 103 may assign the text file 154 a higher priority than the video file 1526.

As another example, folder depth may play a role in how a set of files should be prioritized for downloading from the web-based storage system 110. In particular, if log files tend to have deep hierarchies (i.e., a deep folder depth), and may be created and edited often, but the user is unlikely to require access or view these log files. In this case, the folder depth feature of a file provides a predictive ability that the time of creation and time of last edit features fail to capture. Thus, accounting for the folder depth may allow the predictive model to assign a low ranking to these types of files, even though the files may be created and edited often.

The predictive model that is trained by the ranker training engine 102 and applied by the ranker application engine 103 is based on metadata associated with a file. Importantly, the predictive model is not based on any single feature. Instead, the predictive model is based on a combination of multiple features of user files, and various combinations of the features may cause the predictive model to assign a higher or a lower priority ranking to a file. The metadata shown in the data structure 200 is shown as an example only, and one of ordinary skill will understand that any other suitable metadata that describes a characteristic of the file may be used in addition to or in replacement of any of the metadata shown in the data structure 200.

FIG. 3 is an example data structure 300 that is generated by the ranker application engine 103, which uses the predictive model generated by the ranker training engine 102. The data structure 300 has a similar format as the data structure 200 in FIG. 2, except that the data structure 300 includes compressed information. In particular, the ranker application engine 103 may compress some of the metadata of the data structure 200 into binary features. For example, the data structure 300 includes binary data for the size (i.e., large or small), file type (document or media), time of creation (i.e., recent or not recent), time of last edit (i.e., recent or not recent), and folder depth (i.e., deep or not deep) field entries. In some embodiments, the predictive model operates on binary features rather than on the raw features (such as those that are shown in the data structure 200) because the binary features may be more efficient to process and simpler to characterize.

For each metadata column in the data structure 300, only two features are shown. However, in general, any number of features may be used for each metadata column. For example, size type may be large, medium or small. In some embodiments, different metadata are compressed differently. For example, the size metadata may be compressed into two features (i.e., large or small), as shown in the data structure 300, while the file type metadata may be uncompressed. Similarly, the time of creation metadata may be compressed into two features (i.e., recent or not recent), as shown in the data structure 300, while the time of last edit may be compressed into three or more features (i.e., very recent, somewhat recent, and not recent, for example). The amount of compression performed on each type of metadata may be different for different metadata, and may be dependent on the amount of available training data used to train the predictive model.

The rightmost column in the data structure 300 includes field entries for a score that is assessed by the ranker application engine 103 for each file. The score column is an output of the predictive model that represents a relative likelihood that the user will soon need access to the associated file from the local storage device 104. In an example, the score may be based on a weighted sum of the metadata characteristics, where the weights are assigned in accordance with the predictive model, and the metadata characteristics are quantified into numeric amplitude values. As shown in FIG. 3, the score ranges on a scale between 0 and 1 and is representative of a probability. However, in general, the score may range on any numeric scale, or may include a letter grade, without departing from the scope of the present disclosure.

In some embodiments, the predictive model provides relative weights that are assigned to the metadata features, and the weight is indicative of a predictive quality of each feature. For example, the size and the file type of a particular file may be assigned a higher weight than the folder depth or the time of creation in the predictive model. In particular, the user may be predicted to access small text files much more frequently than large media files. In this case, the size and type of the file are stronger predictors of the likelihood that a user will access these files compared to the folder depth or time of creation of the file. In another example, small zip files may be more likely to be accessed than large zip files. In particular, a large zip file may be used to store archival content, and may not be frequently accessed. In contrast, a small zip file may be used to store work in content, and may be accessed earlier than the large zip file. Similarly, small media files, such as audio music files that last several minutes, may be much more likely to be accessed than large media files, such as video files that last several hours. In these cases, different metadata are assigned different weights, and the score is assessed based on the weights.

In some embodiments, the predictive model uses information regarding the type of the local storage device 104 to select how to score, rank, or select files for downloading from the web-based storage system 110. For example, a user may be more likely to access media files from a mobile device or a tablet device, and document files from a personal computer. In this case, the ranker training engine 102 may use the information regarding the device type in the set of training data to score and rank files differently for different device types. In particular, the set of training data may include whether certain files stored on the web-based storage system 110 are accessed from a tablet device, a mobile phone, a personal computer, or any other suitable type of user device. In this manner, the ranker training engine 102 may generate different predictive models for different types of devices, or the device type may be a feature used in the predictive model for determining how to score and rank files.

After the score is assessed, the ranker application engine 103 may sort the files into an order dictated by the score. In particular, of the six files shown in the data structure 300, the file 154 has the highest score of 0.9. Thus, the file 154 is downloaded first, ahead of the other files that are shown in the data structure 300. Because the file 1857 has the second highest score of 0.8, and the file 931 has the third highest score of 0.6, the files 1857 and 931 are downloaded second and third, respectively. The files 2435 and 1526 have the same score of 0.2. The ranker application engine 103 may be configured to prioritize files in accordance with a tie-breaking method when multiple files have the same score. For example, the ranker application engine 103 may select to download the file 2435 before the file 1526 because the file 2435 is smaller than the file 1526, and therefore should take less time to download. After both files 2435 and 1526 are downloaded, the file 675 has the lowest score of 0.1 and will be downloaded last from the web-based storage system 110.

As shown in the data structure 300, only six files are selected to be downloaded from the web-based storage system 110. However, any number of files may be selected to be downloaded. Moreover, only five metadata features are shown in FIGS. 2 and 3, but in general, one of ordinary skill in the art will understand that any other suitable features may also be used. In an example, the relationship between the user and a file may be a metadata feature that is considered in the predictive model. In particular, a user who is listed as an owner or editor of a file may have a higher priority associated with the file than a user who is listed as a commenter or viewer of the same file. In this case, the predictive model may assign the same file different priorities for different users.

In some embodiments, the metadata features that are considered by the predictive model are automatically determined, such as by the ranker training engine 102. Alternatively, the local storage device 104 may be configured to prompt a user to select which features should be considered in the predictive model. Similarly, the local storage device 104 may be configured to allow a user to overwrite the output of the ranker application engine 103 to change the priority of certain files, such as by selecting one or more files to download first, regardless of its score.

Figure 4:
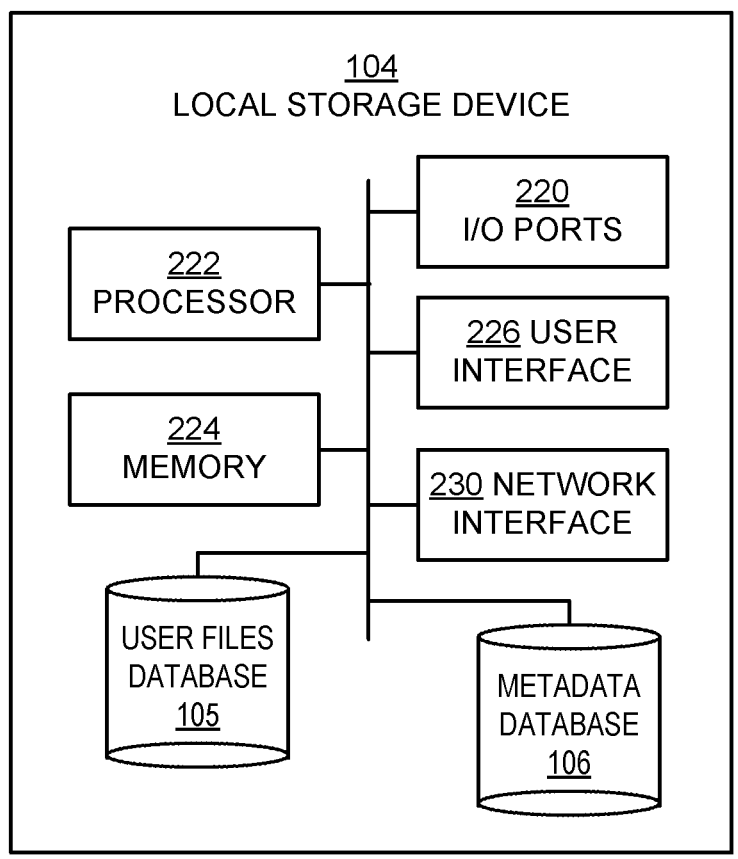
FIG. 4 is a block diagram of a local storage device that stores files downloaded from a web-based storage system, according to an illustrative embodiment.

FIG. 4 is a detailed block diagram of the local storage device 104. The local storage device 104 includes input/output (I/O) ports 220, a processor 222, a memory 224, a user interface 226, a network interface 230, a user files database 105 and a metadata database 106, all connected over a data bus. The user at the local storage device 104 interacts with the local storage device 104 over the user interface 226, which includes a display unit and a user input unit. For example, the user interface 226 may include a keyboard and/or a mouse that allows the user to select certain files that may be stored in user data database 115, for downloading from the web-based storage system 110. The user may select all the user files stored in the user data database 115, or a subset thereof. After the files are selected, ranker application engine 103 applies the predictive model onto the selected files to rank the selected files in a suitable order for downloading. The network interface 230 provides for communication between the local storage device 104 and the network 101, and files are downloaded in the specified order over the network interface 230 from the web-based storage system. The I/O ports 220 may include ports for a user to connect an external device to the local storage device 104. The user may then select, via the user interface 226, to download files from the web-based storage system 110 to the external device. In an example, the external device may be a USB storage device or any other suitable device that may store user files.

The processor 222 may be configured to perform any of the functions described herein as being performed by the local storage device 104, the ranker training engine 102, or the ranker application engine 103. In an example, the processor 222 may communicate with the web-based storage system 110 to perform a machine learning technique on the data that is stored in the user data database 116 to define a set of rules for ranking files that are to be downloaded from the web-based storage system 110. Moreover, the processor 22 may be configured to apply the set of rules to the files to define the order in which those files are downloaded. The memory 224 may store instructions readable by the processor 222 to carry out the processes described herein.

The local storage device 104 in FIG. 4 is an illustrative example of a device that stores files that are downloaded from the web-based storage system 110. In general, any storage device that is connected to the network 101 may be used, such as personal computers, laptops, work stations, tablets, and mobile devices.

Figure 5:
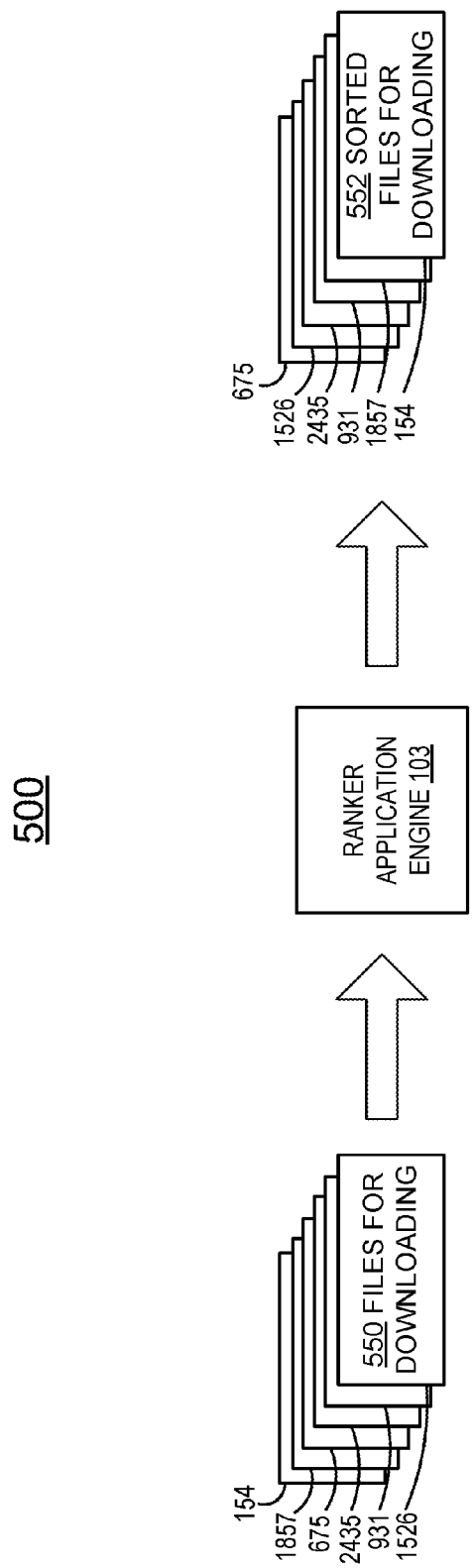
FIG. 5 is a block diagram of a ranker application engine performing a reordering of files to be downloaded from a cloud system, according to an illustrative embodiment.

FIG. 5 is a block diagram of an input and output of the ranker application engine 103. In particular the input to the ranker application engine 103 includes a set of files 550 for downloading from the web-based storage system 110. The files 550 are in an order specified by the data structures 200 and 300, but in general, the files 550 may be in any order. The ranker application engine 103 applies a predictive model to the files 550 to generate scores, such as the scores shown in FIG. 3. The scores are used to assign a priority rank to each file, and the output of the ranker application engine 103 is a set of sorted files 552. As shown in FIG. 5, the ranker application engine 103 changes the order of the files for downloading in accordance with the assessed scores. By sorting the files in this manner, the ranker application engine 103 provides a way for the files to be downloaded in accordance with a predicted likelihood that the user will access these files on the local storage device 104.

Figure 6:
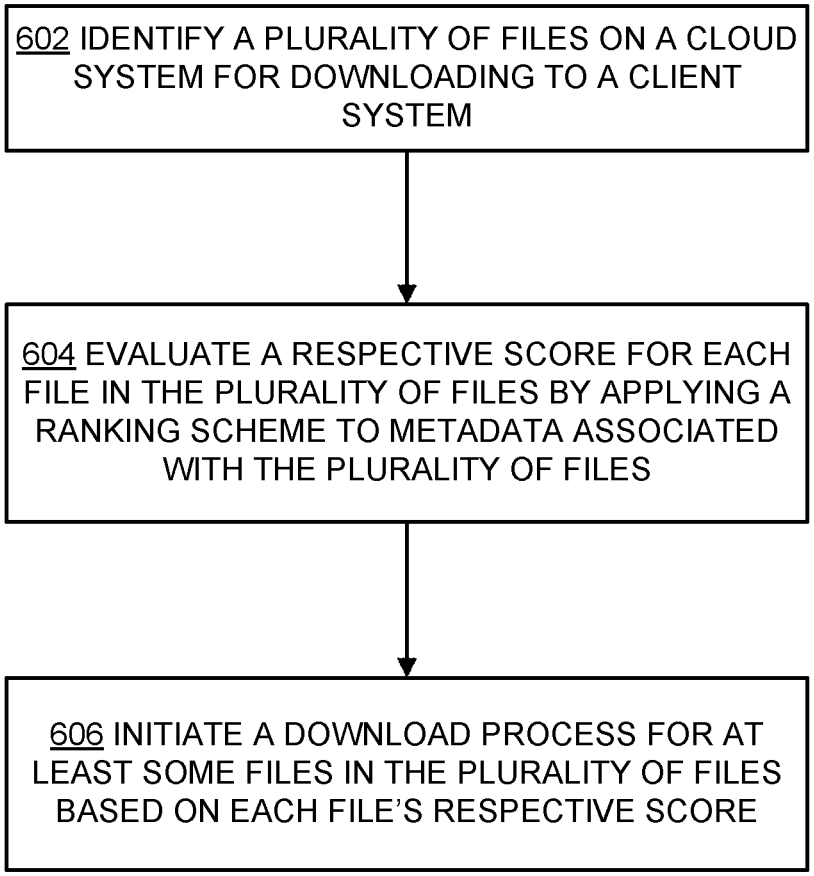
FIG. 6 is a flow chart of an illustrative method for initiating a download process for a set of files stored on a cloud system, according to an illustrative embodiment.

FIG. 6 is a flow chart of an illustrative method 600 for initiating a download process for a set of files that are stored on a cloud system (such as the web-based storage system 110) to a client system (such as the local storage device 104). The method 600 may be executed by an engine such as the ranker application engine 103, and includes the steps of identifying a plurality of files on a cloud system for downloading to a client system (step 602), evaluating a respective score for each file in the plurality of files by applying a ranking scheme to metadata associated with the plurality of files (step 604), and initiating a download process for each file in the plurality of files based on each file's respective score (step 606).

At 602, the ranker application engine 103 identifies a plurality of files that are stored on a cloud system for downloading to a client system. Examples of a client system include the local storage device 104 or any other suitable device that is capable of storing user files and is configured to download files from a cloud system, such as the web-based storage system 110 described in relation to FIG. 1. The plurality of files may be a set of files that are specified by the user over a user interface, and may correspond to all the files that are associated with the user and stored on the cloud system, or a subset of the files that are associated with the user and stored on the cloud system.

At 604, the ranker application engine 103 evaluates a respective score for each file in the plurality of files by applying a ranking scheme to metadata associated with the plurality of files. In an example, the metadata shown in the data structures 200 or 300 may be provided to the ranker application engine 103, which assigned a score in accordance with the predictive model that was trained by the ranker training engine 102. In particular, the ranking scheme may correspond to the predictive model, which is a set of rules that define whether one combination of metadata features would cause a file to be prioritized over another file with a different combination of metadata features. In other words, having one or more certain combinations of metadata features may cause a file to be assigned a higher rank than other files with different combinations of metadata features. An example score is shown in the rightmost column of FIG. 3. As was described above, the score of a file may correspond to a predicted likelihood that the user will need to soon access the file on the local storage device 104 after it is downloaded. The respective score may be indicative of a predicted frequency that the user will access the respective file on the client system, or the likelihood that the user will soon access the respective file on the client system.

At 606, a download process is initiated for each of the files in the plurality of files based on each file's respective score. For example, as described in relation to FIG. 3, the files that have higher scores are those that are predicted to be accessed earlier than files that have lower scores. Thus, the download process downloads the files with higher scores earlier than files with lower scores, so that the user will have earlier access to the files with higher priority. In some embodiments, the score provided by the ranker application engine 103 is adjusted based on one or more other factors not captured by the predictive model. In an example, a first file may be boosted, or prioritized earlier than a second file, even if the first file has a lower score than the second file. In particular, the first file may have only a slightly lower score than the second file, yet the first file may be significantly smaller than the second file. In this case, even though the first file has a lower score than the second file, it would take much less time for the first file to be downloaded than for the second file to be downloaded. Therefore, it may be desirable to boost the first file ahead of the second file because it may be more desirable to delay the downloading of the second file by a small amount (i.e., the amount of time it takes to download the first file) than to delay the downloading of the first file by a large amount (i.e., the amount of time it takes to download the second file). In this manner, smaller files may be favored and prioritized over larger files, even when the scores of the files indicate that the smaller files are less likely to be accessed than the larger files.

Figure 7:
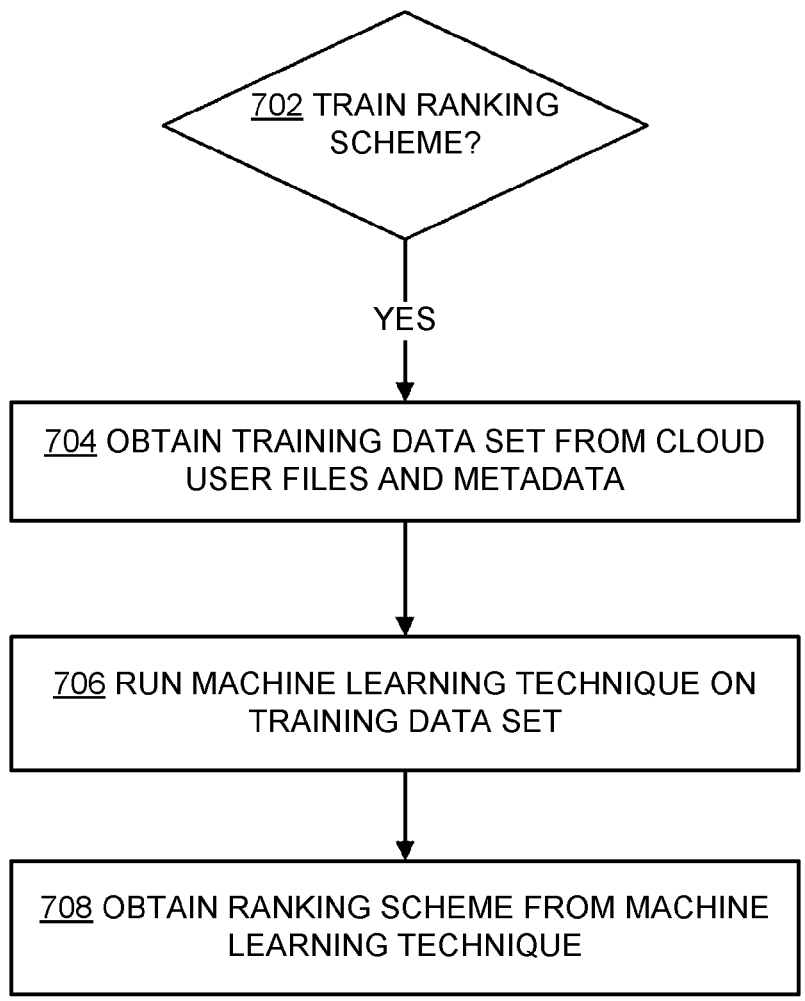
FIG. 7 is a flow chart of an illustrative method for training a ranking scheme based on data associated with files stored on a cloud system, according to an illustrative embodiment.

FIG. 7 is a flowchart of an illustrative method 700 for training a ranking scheme based on data that is stored on a cloud system. The method 700 may be executed by the ranker training engine 102, and includes the steps of determining whether to train a ranking scheme (decision block 702), obtaining training data set from cloud user files and metadata (step 704), running a machine learning technique on the training data set (step 706), and obtaining a ranking scheme from the machine learning technique (step 708).

At decision block 702, the ranker training engine 102 determines whether to train a ranking scheme. In particular, the ranking scheme corresponds to a predictive model that predicts a likelihood that a user will access a certain file from the client system soon after the file is downloaded from a cloud system. The ranker training engine 102 may determine to train a ranking scheme when a threshold amount of user data is reached on the cloud system. In particular, training a ranking scheme may require a minimal amount of training data, such that it may be determined to train a ranking scheme when that minimal amount of training data is reached. In some embodiments, even after a ranking scheme has been trained, it may be desirable to retrain or update the ranking scheme after the training data changes. In particular, the training data corresponds to user files and metadata stored on the cloud system, and any time the user files are deleted, added, modified, or otherwise updated, it may be desirable to retrain the ranking scheme. Alternatively, the training data may be assessed periodically to determine whether the training data has changed by a threshold amount since the last time the ranking scheme was trained. When the training data has changed by the threshold amount, the ranking scheme may be retrained or updated. In another example, rather than determining whether to train the ranking scheme based on changes to the user data, the ranking scheme may be retrained or updated periodically, such as every day, week, month, or any other suitable time period. In another example, the ranker training engine 102 may determine to train a ranking scheme upon receiving a user input to update the ranking scheme.

At step 704, the ranker training engine 102 obtains a training data set from cloud user files and metadata. As an example, the training data set may correspond to metadata associated with the cloud user files stored on user data database 116, as well as a frequency that the users access and edit the cloud user files. In some embodiments, the training data set includes data indicative of user feedback for the predictive model. In particular, the user may provide a user input via the local storage device 104 that indicates a desire to immediately download one or more particular files, before other files are downloaded. The user input may indicate a desire to immediately access certain files over others, regardless of the ranking provided by the predictive model. In this case, the training data set may include data regarding this user input, and the ranker training engine 102 may use the user input as feedback for performance of the predictive model. In an example, a current predictive model may assign a higher priority to a large document file and a lower priority to a small document file. During the downloading of the large document file, the user may provide a user input such as a user selection of the smaller document file, indicating that the user wishes to immediately access the smaller document file. The ranker training engine 102 may make use of this user input by changing the relative weights of the model features. The result of changing the relative weights of the features may cause an increase in the scores assessed for small document files (or any other files that are selected by the user for immediate downloading or access) relative to large document files (or any other files that were assigned higher rank than the user selected files).

At 706, the ranker training engine 102 runs a machine learning technique on the training data. The machine learning technique may include a machine learning ranking algorithm, which provides a set of rules defining which features of a user file are predictive of a likelihood or of a frequency that the user will access a file on the client system. To run the machine learning technique, the ranker training engine receives two inputs: an input vector (i.e., the metadata) and an answer vector (i.e., the frequency of access of the files). The ranker training engine 102 applies statistical modeling methods to fit a predictive model that is used to predict the frequency of access from the metadata. The predictive model includes the set of rules that define how certain features of a file, such as its metadata, are predicted to affect the frequency of access of that file by the user. The predicted frequencies of access of the set of files (as predicted by the predictive model) are compared to the actual frequencies of access of the set of files (i.e., the answer vector). If the predicted frequencies mostly match the actual frequencies, the predictive model has performed well. However, if there are substantial differences between the predicted frequencies and the actual frequencies, one or more parameters of the predictive model may be updated, and the updated predicted frequencies may be compared to the actual frequencies. This process may be repeated until the performance of the predictive model satisfies one or more criteria. After it is determined that the one or more criteria are satisfied, the predictive model corresponds to a ranking scheme that is used to prioritize the set of files for downloading, which may have unknown frequencies of access.

At 708, the ranker training engine 102 obtains a ranking scheme from the machine learning technique. As described above, the ranking scheme defines a set of rules that define a relative weight or a relative importance of each feature of a cloud user file for predicting a likelihood that the user will access or edit the user files on the client system. After being trained, the ranking scheme is transmitted to the ranker application engine 103, which applies the ranking scheme to assign a ranking order to a test data set, corresponding to the set of files for downloading from the cloud system to the client system. In this way, applying the trained ranking scheme to the test data set allows for prediction of the likelihood that the user will wish to have early access the downloaded files from the client system.

Figure 8:
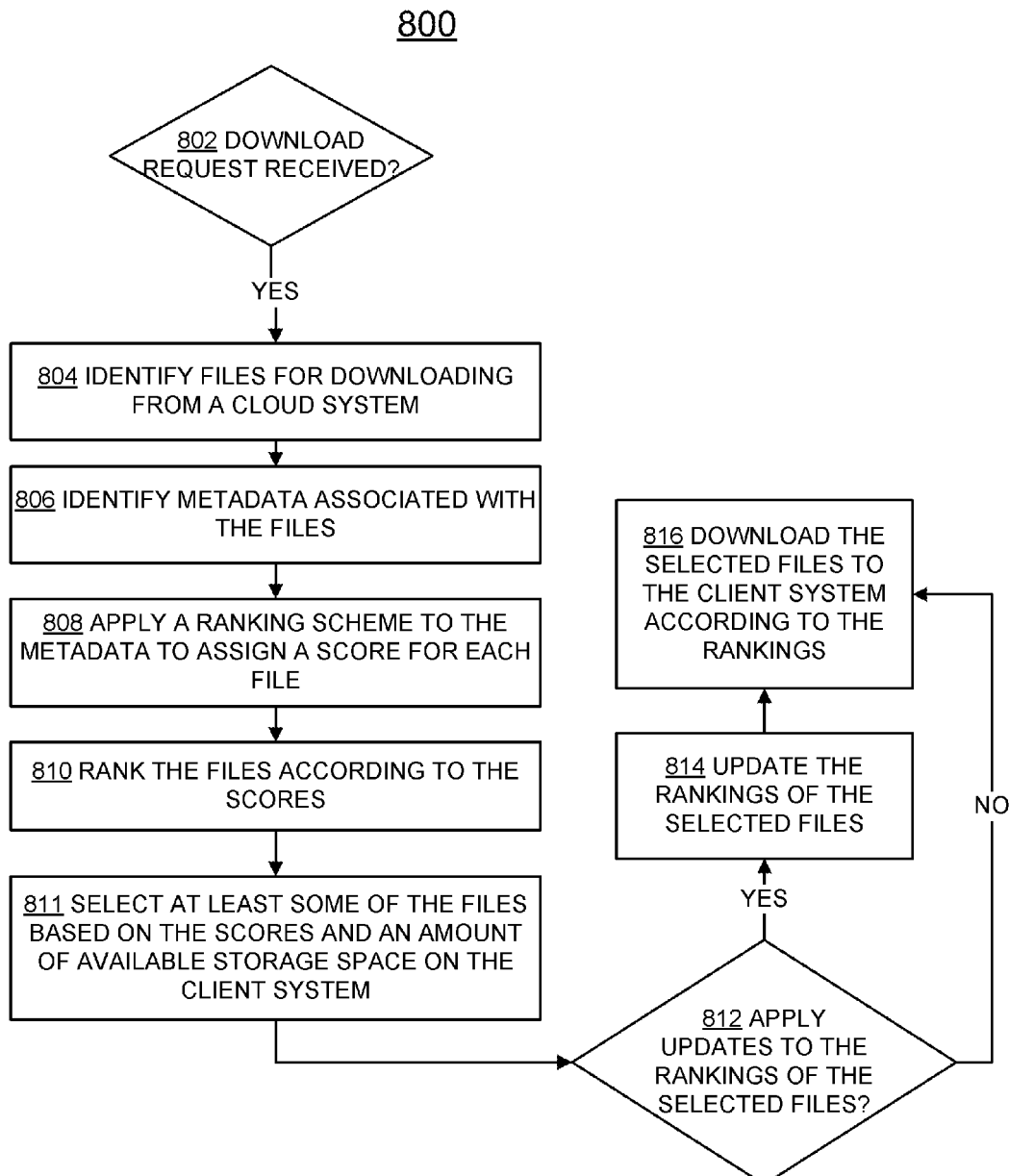
FIG. 8 is a flow chart of an illustrative method for applying a ranking scheme to files stored on a cloud system for downloading to a client system, according to an illustrative embodiment.

FIG. 8 is a flowchart of an illustrative method 800 for downloading data stored on a cloud system (such as the web-based storage system 110) to a client system (such as the local storage device 104). The method 800 may be performed by the cloud system, the client system, and/or the ranker application engine 103 and includes the steps of determining whether a download request is received (decision block 802), identifying files to download from a cloud system (step 804), identifying metadata associated with the files (step 806), applying a ranking system to the metadata to assign a score for each file (step 808), ranking the files according to the scores (step 810), selecting at least some of the files based on the scores and an amount of available storage space on the client system (step 811), and determining whether to apply updates to the rankings (decision block 812). If updates should be applied, the rankings are updated (step 814) before the files are downloaded to the client system according to the rankings (step 816).

At decision block 802, the ranker application engine 103 determines that a download request is received. In particular, a user at the client system may interact with the client system over a user interface such as the user interface 226 to indicate a set of files on the cloud system for downloading to the client system. The user may select all the user files associated with the user and stored on the cloud system, or a subset thereof. At step 804, the ranker application engine 103 identifies metadata associated with the selected files. As an example, the metadata shown in the data structure 200 may be identified.

At step 808, the ranker application engine 103 applies a ranking scheme to the metadata identified at step 806 to rank the selected files in a suitable order for downloading from the cloud system. In particular, the ranking scheme may be trained in accordance with the method described in relation to FIG. 7, and may be transmitted to the ranker application engine 103 from the ranker training engine 102. As described above, the score assigned to each respective file is indicative of a predicted likelihood that the user will need to soon access the respective file on the client system after it is downloaded. In particular, the score as shown in the data structure 300 may correspond to the score that is assigned by the ranker application engine 103 at step 808. At step 810, the files are ranked according to the scores. In particular, files with scores that indicate a high predicted likelihood that the user will need to soon access the file on the client system are ranked higher or prioritizes over files with scores that indicate lower predicted likelihoods.

At step 811, at least some of the files in the files identified at step 804 are selected for downloading. In some embodiments, the ranker application engine 103 performs the selection at step 811, or another device may perform the selection. In particular, the set of selected files may be selected based at least in part on an amount of available storage space on the client system. For example, the total amount of file content selected for downloading may be limited by a threshold amount of storage space available on the client system. The limit may be set based on the total amount of available storage space, a proportion thereof, a fixed amount, a number of files, or a combination thereof. In an example, the limit may be a fraction or percentage of the available storage space on the client system, such as 10%, 20%, 30%, or any other suitable percentage. In this case, even if 1 TB of space is available on the client system, it may be undesirable to take up a large proportion of this available storage space. Thus, only a small amount of the available 1 TB, such as 1, 2, 3, 4, 5 GB, or any other suitable amount may be allocated for storing the data downloaded from the cloud system.

In some embodiments, the limit may be a fixed amount based on the client system and the available storage space on the client system, such as 0.1, 0.2, 0.3, 0.4, 0.5 GB, or any other suitable amount on a mobile device, or 1, 2, 3, or any other suitable amount on a personal computer. In this case, the client system may transmit a message to the cloud system, where the message is indicative of the amount of storage space available on the client system for storing the files to be downloaded. The cloud system may use the received message to determine a suitable set of files for transferring to the client system.

In some embodiments, the limit may be based on a number of files that may be downloaded within a certain amount of storage space. For example, the N files with the highest scores corresponding to the files with the highest predicted likelihoods of requiring user access via the client system may be selected, where N is equal to 5, 10, 100, or any other suitable number of files. In this case, the client system may be configured to transmit a request to the cloud system to transmit the N highest scoring files. The client system may then compare the amount of storage space taken up by the N highest scoring files to an amount of available cache space on the client system. If there is still available cache space available after the transfer, the client system may transmit a second request to the cloud system to transmit the next N highest scoring files. In some embodiments, a bin packing technique may be used by the client system or by the cloud system to perform the selection of the files based on their scores, sizes, and/or amount of available storage space. In this case, an aggregate score may represent a metric that combines the scores of the files that are selected for downloading. The bin packing may be performed using an optimization technique to obtain maximal use of the allocated amount of available storage space while simultaneously achieving a high aggregate score.

At decision block 812, it is determined whether to apply updates to the rankings provided by the scores assigned at step 808. If so, the method 800 proceeds to step 814 to update the rankings In an example, one or more factors other than the score provided by the ranking scheme are considered in determining a ranking order of the files for downloading from the web-based storage system. In particular, the ranker application engine 103 or the client system may be configured to update the order of the files by boosting the priority of one or more files. In an example, a first file may be boosted, or prioritized earlier than a second file, even if the first file has a lower score than the second file. In particular, the first file may have only a slightly lower score than the second file, yet the first file may be significantly smaller than the second file. In this case, even though the first file has a lower score than the second file, it would take much less time for the first file to be downloaded than for the second file to be downloaded. Therefore, it may be desirable to boost the first file ahead of the second file because it may be more desirable to delay the downloading of the second file by a small amount (i.e., the amount of time it takes to download the first file) than to delay the downloading of the first file by a large amount (i.e., the amount of time it takes to download the second file). In this manner, smaller files may be favored and prioritized over larger files, even when the scores of the files indicate that the smaller files are less likely to be accessed than the larger files. Boosting a smaller file ahead of a larger file when the files have similar scores may be desirable for devices that have particularly slow connections over the network 101. After the rankings are updated at step 814, the method 800 proceeds to step 816 to download the files from the cloud system to the client system according to the rankings. Alternatively, if it is determined that no updates are necessary at decision block 812, the method 800 proceeds directly to step 816 to download the files from the cloud system according to the rankings.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for determining an order of files for downloading from a cloud system, the method comprising:
    identifying a first plurality of files on the cloud system for downloading to a client system, wherein the first plurality of files is associated with first metadata;
    evaluating a first respective score for each file in the first plurality of files by applying a first ranking scheme to the first metadata to generate a first ranking of the first plurality of files, wherein the first ranking scheme is based on weights of at least two features of the first metadata;

initiating a first download process for at least some files in the first plurality of files based on the first ranking of the first plurality of files;

receiving, during the first download process and from a user, a user selection of a first file from the first plurality of files, wherein the user selection prioritizes the first file to be downloaded immediately regardless of a ranking of the first file in the first ranking;

instantiating a ranker training procedure to refine the first ranking scheme based on training data to generate a second ranking scheme, wherein the training data comprises a downloading priority of the first file;

evaluating a second respective score for each file in a second plurality of files by applying the second ranking scheme to second metadata associated with the second plurality of files to generate a second ranking of the second plurality of files, wherein the ranker training procedure generates a predicted access frequency of the first file and compares the predicted access frequency to an actual access frequency of the first file, and wherein the second ranking scheme is generated based at least in part on the comparison; and initiating a second download process for each file in the second plurality of files based on the second ranking of the second plurality of files.

2. The method of claim 1, further comprising selecting the at least some files in the first plurality of files based on the first respective score of each file in the first plurality of files and an amount of storage availability on the client system.

3. The method of claim 1, further comprising downloading the first plurality of files to the client system in an order defined by the first respective score of each file in the first plurality of files.

4. The method of claim 1, wherein the first respective score for each respective file in the first plurality of files is indicative of a likelihood that the user will access the respective file on the client system.

5. The method of claim 1, wherein the first ranking scheme is trained using a machine learning technique on existing cloud data in the cloud system.

6. The method of claim 5, further comprising separating the existing cloud data into at least two groups of cloud data, and applying the machine learning technique on the at least two groups of cloud data to train at least two ranking schemes.

7. The method of claim 1, wherein the first metadata comprises at least two of: file size, file type, file history, time of last write, time of last access, time of initial creation, folder depth, or user specific data.

8. The method of claim 1, wherein the first metadata comprises a set of binary features that describe each file in the first plurality of files.

9. The method of claim 1, wherein the cloud system comprises a processor that applies the first ranking scheme to the first plurality of files.

10. The method of claim 1, wherein the cloud system comprises a processor that periodically updates the first ranking scheme based on updated cloud data.

11. A system for determining an order of files for downloading from a cloud system, the system comprising:
at least one memory that stores instructions; and
at least one processor, coupled to the at least one memory, configured to execute the instructions to:

identify a first plurality of files on the cloud system for downloading to a client system, wherein the first plurality of files is associated with first metadata;

evaluate a first respective score for each file in the first plurality of files by applying a first ranking scheme to the first metadata to generate a first ranking of the first plurality of files, wherein the first ranking scheme is based on weights of at least two features of the first metadata;

initiate a first download process for at least some files in the first plurality of files based on the first ranking of the first plurality of files;

receive, during the first download process and from a user, a user selection of a first file from the first plurality of files, wherein the user selection prioritizes the first file to be downloaded immediately regardless of a ranking of the first file in the first ranking;

instantiate a ranker training procedure to refine the first ranking scheme based on training data to generate a second ranking scheme, wherein the training data comprises a downloading priority of the first file;

evaluate a second respective score for each file in a second plurality of files by applying the second ranking scheme to second metadata associated with the second plurality of files to generate a second ranking of the second plurality of files, wherein the ranker training procedure generates a predicted access frequency of the first file and compares the predicted access frequency to an actual access frequency of the first file, and wherein the second ranking scheme is generated based at least in part on the comparison; and initiate a second download process for each file in the second plurality of files based on the second ranking of the second plurality of files.

12. The system of claim 11, wherein the at least one processor is further configured to select the at least some files in the first plurality of files based on the first respective score of each file in the first plurality of files and an amount of storage availability on the client system.

13. The system of claim 11, wherein the at least one processor is further configured to download the first plurality of files to the client system in an order defined by the first respective score of each file in the first plurality of files.

14. The system of claim 11, wherein the first respective score for each respective file in the first plurality of files is indicative of a likelihood that the user will access the respective file on the client system.

15. The system of claim 11, wherein the first ranking scheme is trained using a machine learning technique on existing cloud data in the cloud system.

16. The system of claim 15, wherein the at least one processor is further configured to separate the existing cloud data into at least two groups of cloud data, and apply the machine learning technique on the at least two groups of cloud data to train at least two ranking schemes.

17. The system of claim 11, wherein the first metadata comprises at least two of: file size, file type, file history, time of last write, time of last access, time of initial creation, folder depth, or user specific data.

18. The system of claim 11, wherein the first metadata comprises a set of binary features that describe each file in the first plurality of files.

19. The system of claim 11, wherein the at least one processor applies the first ranking scheme to the first plurality of files.

20. The system of claim 11, wherein the cloud system comprises the at least one processor that periodically updates the first ranking scheme based on updated cloud data.

* * * * *